US011199226B2

(12) United States Patent
Murata et al.

(10) Patent No.: US 11,199,226 B2
(45) Date of Patent: Dec. 14, 2021

(54) ROLLING BEARING

(71) Applicant: JTEKT CORPORATION, Osaka (JP)

(72) Inventors: Junji Murata, Kashiba (JP); Shigeo Kamamoto, Kashiwara (JP); Yuki Shishihara, Kashiwara (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 16/856,413

(22) Filed: Apr. 23, 2020

(65) Prior Publication Data
US 2020/0340532 A1     Oct. 29, 2020

(30) Foreign Application Priority Data

Apr. 26, 2019 (JP) .............................. JP2019-085130

(51) Int. Cl.
| | | |
|---|---|---|
| *F16C 33/66* | (2006.01) | |
| *F16C 33/34* | (2006.01) | |
| *F16C 33/58* | (2006.01) | |

(52) U.S. Cl.
CPC .......... *F16C 33/6651* (2013.01); *F16C 33/34* (2013.01); *F16C 33/585* (2013.01)

(58) Field of Classification Search
CPC ...... F16C 33/34; F16C 33/583; F16C 33/585; F16C 33/6651; F16C 33/6677; F16C 2240/54; F16C 2240/90
See application file for complete search history.

(56) References Cited

U.S. PATENT DOCUMENTS

| | | | | |
|---|---|---|---|---|
| 5,064,298 A | * | 11/1991 | Hibi ..................... | F16C 13/006 384/625 |
| 6,371,656 B1 | * | 4/2002 | De Vries ................. | F16C 33/64 384/565 |
| 8,123,413 B2 | * | 2/2012 | Tambe .................... | F16C 33/34 384/565 |
| 8,197,146 B2 | * | 6/2012 | Tsujimoto ............... | F16C 33/34 384/450 |

(Continued)

FOREIGN PATENT DOCUMENTS

| | | | |
|---|---|---|---|
| JP | 2003-113843 | * | 4/2003 |
| JP | 2015-083861 A | | 4/2015 |
| JP | 2017-207316 A | | 11/2017 |

OTHER PUBLICATIONS

Translation of JP2003-113843, translation of document as published of Apr. 2003.*
JIS B 0601-2001 standard, obtained Jun. 2, 2021.*

*Primary Examiner* — James Pilkington
(74) *Attorney, Agent, or Firm* — Oliff PLC

(57) ABSTRACT

A rolling bearing includes a first raceway surface; a second raceway surface; and a plurality of rolling elements rotatably arranged between the first raceway surface and the second raceway surface. Multiple recesses are provided on at least one surface among the first raceway surface, the second raceway surface, and rolling surfaces of the plurality of the rolling elements. An area ratio of openings of the recesses to the at least one surface is in a range of 5% to 37%. An equivalent circle diameter of the opening of each of the recesses is in a range of 1 µm to 27 µm. A depth of each of the recesses in a direction normal to the at least one surface is in a range of 3 µm to 10 µm. A surface waviness of the at least one surface excluding the recesses is smaller than or equal to 0.2 µm.

3 Claims, 8 Drawing Sheets

(56) References Cited

U.S. PATENT DOCUMENTS

2006/0182377 A1\* 8/2006 Akamatsu ............ F16C 33/585
                                                                  384/492
2016/0281776 A1    9/2016 Kitamura et al.

\* cited by examiner

FIG. 8

| SAMPLE NAME | ROTATIONAL SPEED (m/s) | AREA RATIO OF RECESSES (%) | EQUIVALENT CIRCLE DIAMETER OF RECESS (μm) | DEPTH OF RECESS (μm) | SURFACE WAVINESS (μm) | OIL FILM THICKNESS CHANGE AMOUNT |
|---|---|---|---|---|---|---|
| A-1 | 0.1 | 11 | 2.43 | 0.287 | 0.071 | -0.2 |
| A-2 | 1 | 11 | 2.43 | 0.287 | 0.071 | 4.5 |
| A-3 | 2 | 11 | 2.43 | 0.287 | 0.071 | 4.0 |
| B-1 | 0.1 | 35 | 21.63 | 0.499 | 0.107 | -0.2 |
| B-2 | 1 | 35 | 21.63 | 0.499 | 0.107 | 8.0 |
| B-3 | 2 | 35 | 21.63 | 0.499 | 0.107 | 5.7 |
| C-1 | 0.1 | 50 | 41.69 | 0.815 | 0.384 | -5.0 |
| C-2 | 1 | 50 | 41.69 | 0.815 | 0.384 | -6.2 |
| C-3 | 2 | 50 | 41.69 | 0.815 | 0.384 | -16.6 |
| D-1 | 0.1 | 12 | 2.81 | 1.557 | 0.163 | -0.2 |
| D-2 | 1 | 12 | 2.81 | 1.557 | 0.163 | 3.6 |
| D-3 | 2 | 12 | 2.81 | 1.557 | 0.163 | -2.5 |
| E-1 | 0.1 | 45 | 42.79 | 2.425 | 0.712 | -3.6 |
| E-2 | 1 | 45 | 42.79 | 2.425 | 0.712 | -16.6 |
| E-3 | 2 | 45 | 42.79 | 2.425 | 0.712 | -10.5 |
| F-1 | 0.1 | 18 | 7.37 | 3.231 | 0.268 | 5.4 |
| F-2 | 1 | 18 | 7.37 | 3.231 | 0.268 | 1.8 |
| F-3 | 2 | 18 | 7.37 | 3.231 | 0.268 | -0.1 |
| G-1 | 0.1 | 15 | 15.31 | 4.788 | 0.148 | 9.4 |
| G-2 | 1 | 15 | 15.31 | 4.788 | 0.148 | 11.4 |
| G-3 | 2 | 15 | 15.31 | 4.788 | 0.148 | 7.7 |
| H-1 | 0.1 | 2.1 | 16.03 | 6.102 | 0.125 | -5.9 |
| H-2 | 1 | 2.1 | 16.03 | 6.102 | 0.125 | 0.1 |
| H-3 | 2 | 2.1 | 16.03 | 6.102 | 0.125 | -0.5 |
| J-1 | 0.1 | 1.5 | 21.54 | 7.93 | 0.14 | -0.9 |
| J-2 | 1 | 1.5 | 21.54 | 7.93 | 0.14 | 2.5 |
| J-3 | 2 | 1.5 | 21.54 | 7.93 | 0.14 | -1.5 |

ROLLING BEARING

CROSS-REFERENCE TO RELATED APPLICATION

This application claims priority to Japanese Patent Application No. 2019-085130 filed on Apr. 26, 2019, incorporated herein by reference in its entirety.

BACKGROUND

1. Technical Field

The disclosure relates to rolling bearings.

2. Description of Related Art

For example, a planet gear that is used in a planetary gear mechanism in a transmission is rotatably supported on a support shaft of a carrier via a needle roller bearing. The needle roller bearing is lubricated by forcibly supplying lubricating oil from the support shaft-side (refer to Japanese Unexamined Patent Application Publication No. 2015-083861 (JP 2015-083861 A)).

SUMMARY

In recent years, an amount of lubricant oil in a bearing tends to be reduced because an amount of the lubricant oil that is forcibly supplied to the bearing is reduced for the purposes of saving natural resources and energies, and further, the lubricant oil is scattered by a centrifugal force generated by rotation of the bearing at a higher speed. When the amount of the lubricating oil in the bearing is reduced, a shortage of an oil film occurs, which results in a temperature rise and seizure of the bearing.

The disclosure provides a rolling bearing capable of restraining a temperature rise and improving a seizure resistance.

As a result of intensive studies, the inventors have found that, by providing multiple recesses on at least one surface among rolling surfaces of rolling elements and raceway surfaces on which the rolling elements roll, and setting an area ratio of openings of the recesses, an equivalent circle diameter and a depth of each recess, and a surface waviness of the surface excluding the recesses in appropriate ranges, lubricant oil can be easily accumulated in the recesses and an oil film thickness (i.e., a thickness of an oil film) on the surface can be increased. The inventors have completed the disclosure based on such findings.

An aspect of the disclosure relates to a rolling bearing including a first raceway surface; a second raceway surface; and a plurality of rolling elements rotatably arranged between the first raceway surface and the second raceway surface. Multiple recesses are provided on at least one surface among the first raceway surface, the second raceway surface, and rolling surfaces of the plurality of the rolling elements. An area ratio of openings of the recesses to the at least one surface is in a range of 5% to 37%. An equivalent circle diameter of the opening of each of the recesses is in a range of 1 μm to 27 μm. A depth of each of the recesses in a direction normal to the at least one surface is in a range of 3 μm to 10 μm. A surface waviness of the at least one surface excluding the recesses is smaller than or equal to 0.2 μm.

In the rolling bearing according to the above aspect of the disclosure, the lubricant oil can be easily accumulated in the recesses provided on at least one surface among the first raceway surface, the second raceway surface, and the rolling surfaces of the rolling elements, and the oil film thickness on the at least one surface can be increased. With this configuration, the shortage of the oil film on the at least one surface can be restrained. Therefore, a temperature rise of the rolling bearing can be restrained, and the seizure resistance can be improved.

The rolling elements may be rollers. In this case, a temperature rise of the rolling bearing including the rollers as the rolling elements can be restrained, and the seizure resistance can be improved.

Each of the rolling elements may be any one of a needle roller, a cylindrical roller, and a long cylindrical roller. In this case, a temperature rise of the rolling bearing including any of the needle rollers, the cylindrical rollers, and the long cylindrical rollers (i.e., rod rollers) as the rolling elements can be restrained, and the seizure resistance can be improved.

According to the rolling bearing of the above aspect of the disclosure, a temperature rise can be restrained and the seizure resistance can be improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 8 is a table showing the results of the evaluation test.

DETAILED DESCRIPTION OF EMBODIMENTS

Figure 1:
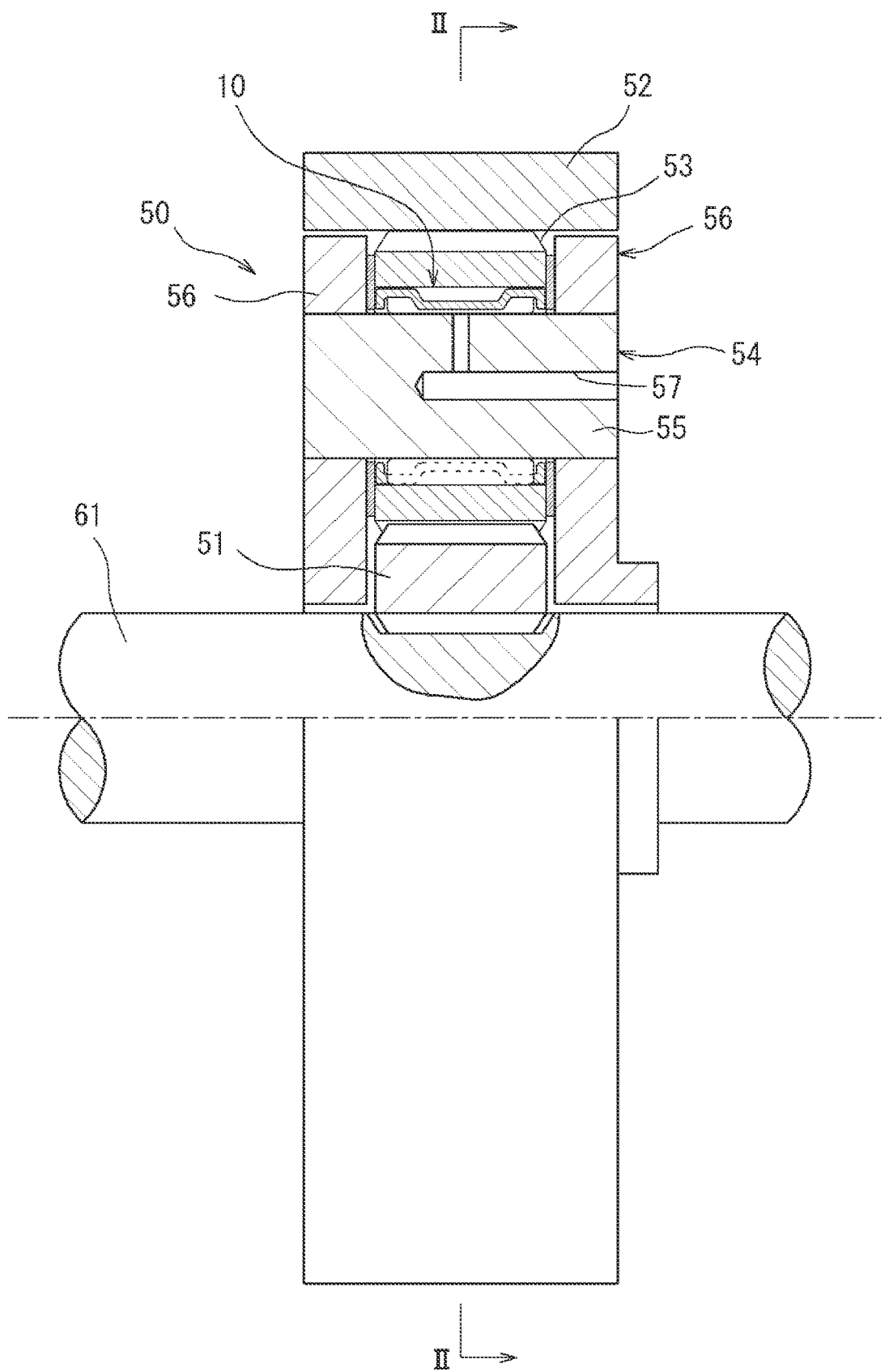
FIG. 1 is a partial sectional view of a planetary gear mechanism including a rolling bearing according to an embodiment of the disclosure.
Figure 2:
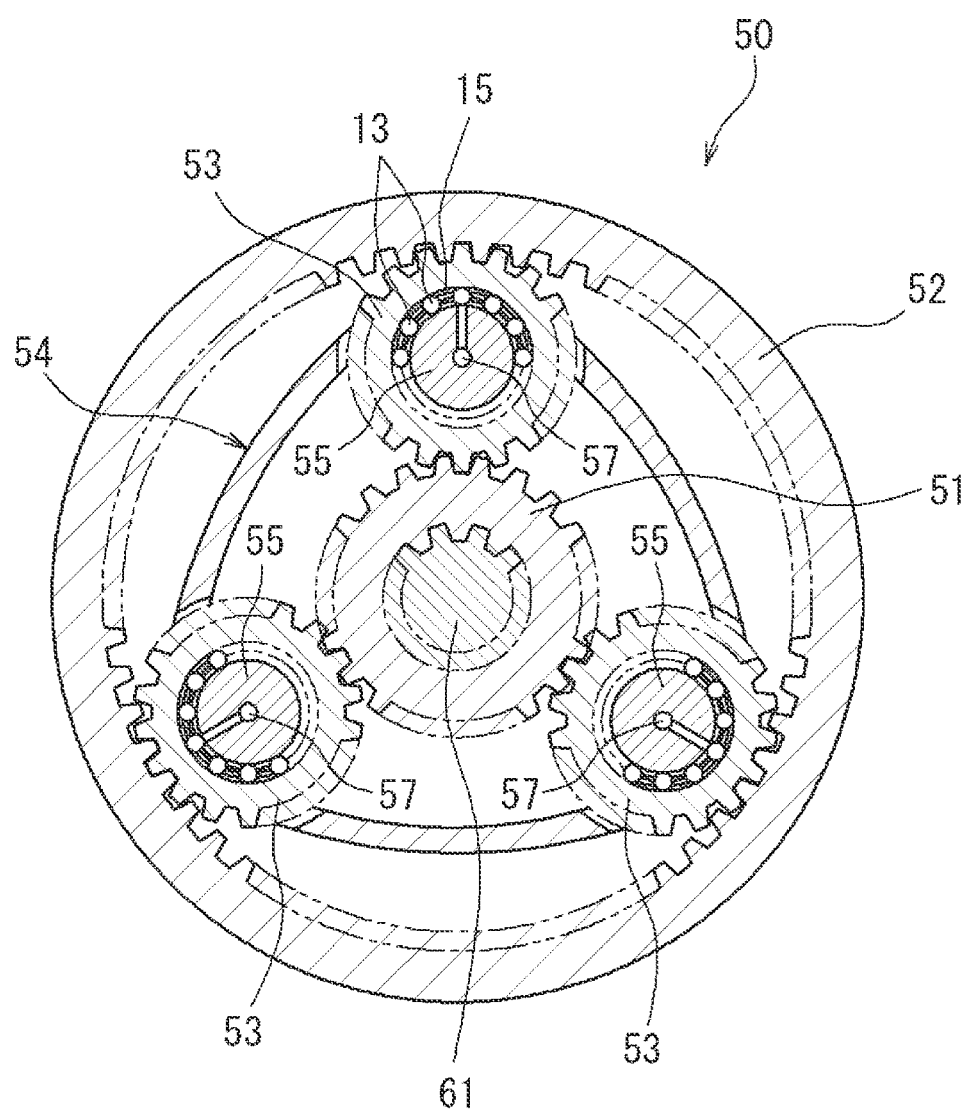
FIG. 2 is a sectional view taken along a line II-II in FIG. 1.

FIG. 1 is a partial sectional view of a planetary gear mechanism including a rolling bearing according to an embodiment of the disclosure. FIG. 2 is a sectional view taken along a line II-II in FIG. 1. In FIGS. 1 and 2, a planetary gear mechanism 50 is used, for example, in a transmission of a vehicle (e.g., an automobile). The planetary gear mechanism 50 includes a sun gear 51, an internal gear (ring gear) 52, a plurality of planet gears 53, and a carrier 54.

The sun gear 51 is fitted to an outer periphery of a rotary shaft 61, and is rotatable integrally with the rotary shaft 61.

The internal gear 52 is disposed radially outward of the sun gear 51 so as to be concentric with the sun gear 51. The plurality of planet gears 53 (three planet gears in this embodiment) are disposed in a circumferential direction of the sun gear 51 and mesh with an outer periphery of the sun gear 51. Further, each of the planet gears 53 meshes with an inner periphery of the internal gear 52.

The carrier 54 includes a plurality of shafts 55 and a pair of carrier bodies 56. Each of the shafts 55 supports a corresponding one of the planet gears 53 such that the corresponding one planet gear 53 is rotatable via a rolling bearing 10. The carrier bodies 56 support respective ends of the shafts 55. With this configuration, each of the planet gears 53 rotates about an axis of the corresponding shaft 55 that supports the planet gear 53 and also revolves around the outer periphery of the sun gear 51.

Figure 3:
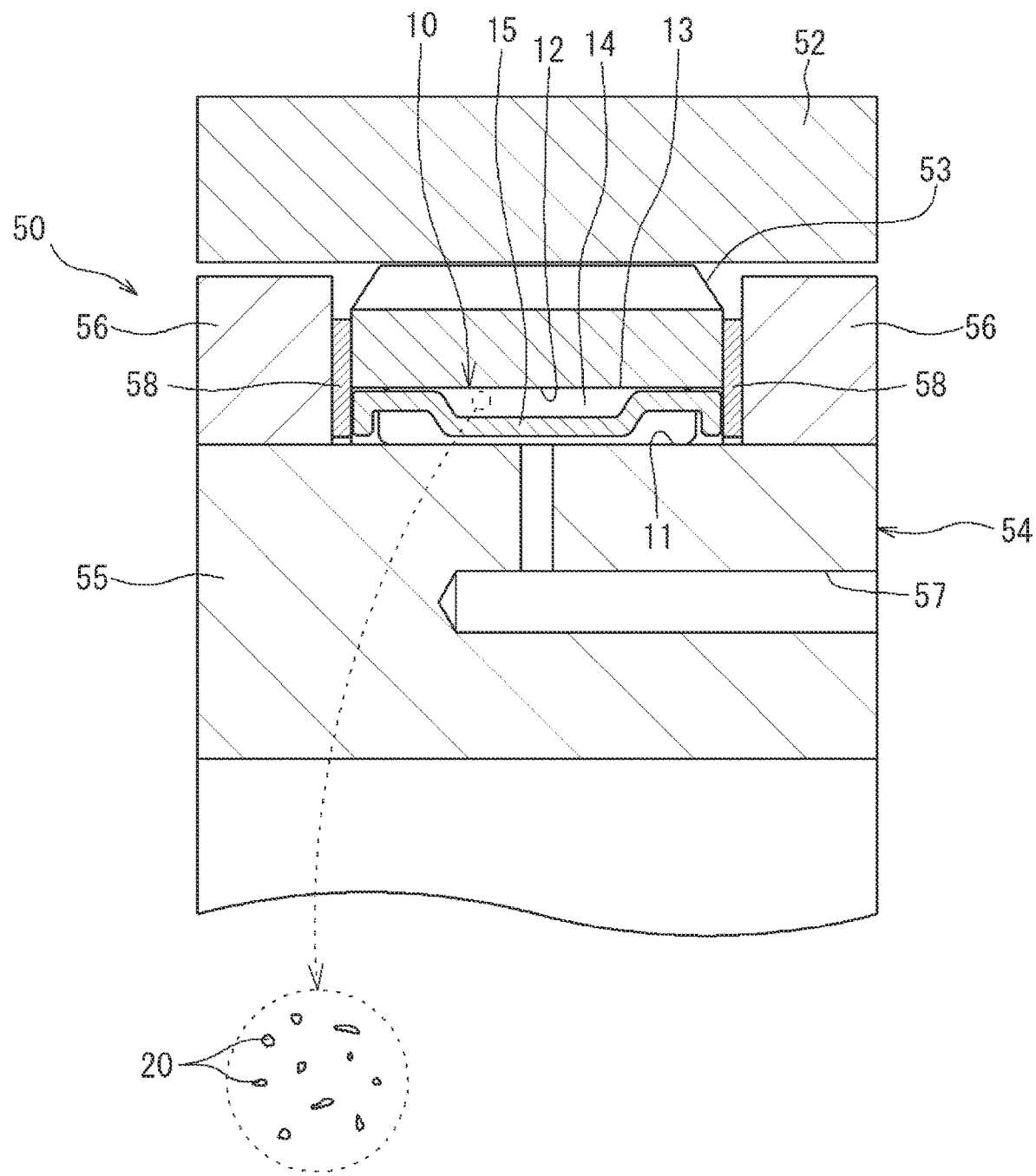
FIG. 3 is an enlarged sectional view showing the rolling bearing.

FIG. 3 is an enlarged sectional view showing the rolling bearing. The rolling bearing 10 is a needle roller bearing, and includes a first raceway surface 11, a second raceway surface 12, a plurality of needle rollers (rolling elements) 13, and a cage 15. The first raceway surface 11 is provided at an axially central portion of the outer peripheral surface of the shaft 55. The second raceway surface 12 is provided on the inner peripheral surface of the planet gear 53.

In FIGS. 2 and 3, the needle rollers 13 are arranged so as to be rollable between the first raceway surface 11 and the second raceway surface 12. An outer peripheral surface of the needle roller 13 serves as a rolling surface 14 that rolls on the first and second raceway surfaces 11, 12. The cage 15 has an annular shape, and holds the needle rollers 13 at predetermined intervals along the circumferential direction. An outer peripheral surface of the cage 15 slidably contacts the inner peripheral surface of the planet gear 53 such that rotation of the cage 15 is guided.

An oil passage 57 is provided in the shaft 55 for forcibly supplying lubricating oil to an inside of the rolling bearing 10. The oil passage 57 extends from one axial end of the shaft 55 (the right end in FIG. 3) toward the other axial end, extends radially outward from the axial central portion of the shaft 55, and opens at the outer peripheral surface of the shaft 55. A washer 58 is interposed between each of the carrier bodies 56 and the corresponding planet gear 53.

Multiple minute recesses 20 for accumulating the lubricating oil are provided on the rolling surface 14 of each of the needle rollers 13. These minute recesses 20 are formed by, for example, forming minute uneven portions by applying blast finishing on the rolling surface 14 and then applying barrel finishing to shave off protrusions of the uneven portions. A shape of the recesses 20 is set as described below such that the lubricant oil is easily accumulated.

A ratio of an area of openings of the recesses 20 to an area of the rolling surface 14, that is, an area ratio of openings of the recesses 20 to the rolling surface 14 (hereinafter simply referred to as an area ratio A of the recesses 20) is set to be greater than or equal to 5% and smaller than or equal to 37% (preferably, greater than or equal to 8% and smaller than or equal to 30%). In other words, the area ratio A of the recesses 20 is set to be in a range of 5% to 37% (preferably, in a range of 8% to 30%). The area ratio A of the recesses 20 can be obtained by measuring the area of openings of the recesses 20 in one field of view when the rolling surface 14 is observed and calculating a percentage (%) of the area of openings to an area of the observed field of view. The area of one observed view is, for example, 0.4 mm².

An equivalent circle diameter of the opening of each recess 20 (hereinafter simply referred to as an equivalent circle diameter B of the recess 20) is set to be greater than or equal to 1 μm and smaller than or equal to 27 μm (preferably greater than or equal to 8 μm and smaller than or equal to 27 μm). In other words, the equivalent circle diameter B of the recess 20 is set to be in a range of 1 μm to 27 μm (preferably in a range of 8 μm to 27 μm). The equivalent circle diameter B of the recess 20 can be obtained by processing a captured image of the rolling surface 14 to measure an area S of the opening of each recess 20 in the rolling surface 14, and using the formula below.

$$B = 2 \times (S/\pi)^{(1/2)}$$

A depth from the opening to the bottom of the recess 20 in a direction normal to the rolling surface 14 (hereinafter simply referred to as a depth C of the recess 20) is set to be greater than or equal to 3 μm and smaller than or equal to 10 μm (preferably, greater than or equal to 3 μm and smaller than or equal to 9.6 μm). In other words, the depth C of the recess 20 is in a range of 3 μm to 10 μm (preferably, in a range of 3 μm to 9.6 μm). Note that a value of the depth C of the recess 20 indicates a maximum valley depth Pv specified in Japan industrial standards (JIS) B 0601-2001. Surface waviness of the rolling surface 14 (hereinafter simply referred to as a surface waviness D) excluding the recesses 20 is set to be smaller than or equal to 0.2 μm (preferably smaller than or equal to 0.16 μm). In other words, the surface waviness D is set to be in a range of 0.2 μm or less (preferably in a range of 0.16 μm or less). The value of the surface waviness D indicates an arithmetic mean waviness Wa specified in JIS B 0601-2001.

Next, an evaluation test conducted by the inventors to verify effects obtained by the rolling bearing of the disclosure will be described. In the evaluation test, nine sets of samples (bearing steel balls) were used. One set included three samples. The samples of each set were processed to have multiple recesses on a part of surfaces of the samples. Basically, the samples were processed by applying blast finishing first and then applying the barrel finishing, as described above.

Three samples in each set were rotated at rotational speeds (0.1 m/s, 1.0 m/s, and 2.0 m/s) different from each other under the condition in which a minute amount of lubricant oil was applied (5 μl of low-viscosity oil was applied to the sample surfaces). Changes in an oil film thickness were then measured at the central portion of each sample where the sample was in contact with the mating member (i.e., counterpart member), and the area ratio of the recesses, the equivalent circle diameter and the depth of the recess, and the surface waviness on the processed surface were also measured.

The changes in the oil film thickness were measured by simultaneously measuring the oil film thickness (i.e., the thickness of the oil film) on the processed surface on which the recesses were provided and the oil film thickness on an unprocessed surface on which the recesses are not provided using a known three-wavelength optical interferometry (for example, refer to Japanese Unexamined Patent Application Publication No. 2017-207316), and calculating a difference between the measured oil film thicknesses. The difference between the oil film thicknesses is a value obtained by subtracting the oil film thickness on the unprocessed surface from the oil film thickness on the processed surface. This value will be hereinafter referred to as an oil film thickness change amount. The oil film thickness change amount indicates that the oil film thickness on the processed surface increases as the value of the oil film thickness change amount increases.

Figure 4:
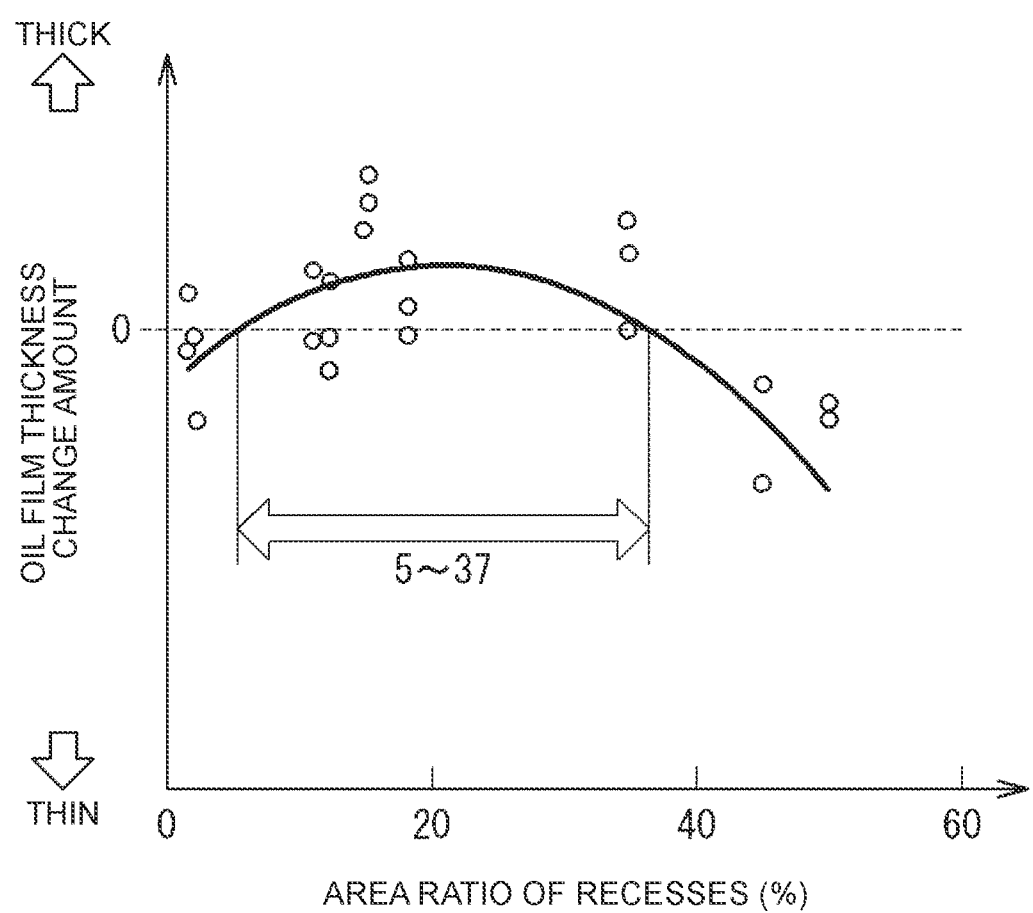
FIG. 4 is a graph showing the results of an evaluation test. In the graph, the vertical axis indicates an oil film thickness change amount, and the horizontal axis indicates an area ratio of recesses.

FIG. 4 is a graph showing the results of the above-described evaluation test. In the graph, the vertical axis indicates the oil film thickness change amount, and the horizontal axis indicates the area ratio of the recesses. As shown in FIG. 4, when the area ratio of the recesses is in the range of 5% to 37% (in other words, when the area ratio of the recesses is greater than or equal to 5% and smaller than or equal to 37%), the values of the oil film thickness change amounts are generally large, and the oil film thicknesses of the processed surfaces on which the recesses are provided are large. Therefore, as can be seen from the graph, by setting the area ratio of the recesses in the range of 5% to 37%, the lubricant oil can be more easily accumulated in the recesses and the oil film thickness can be made large (i.e., the oil film thickness can be increased).

Figure 5:
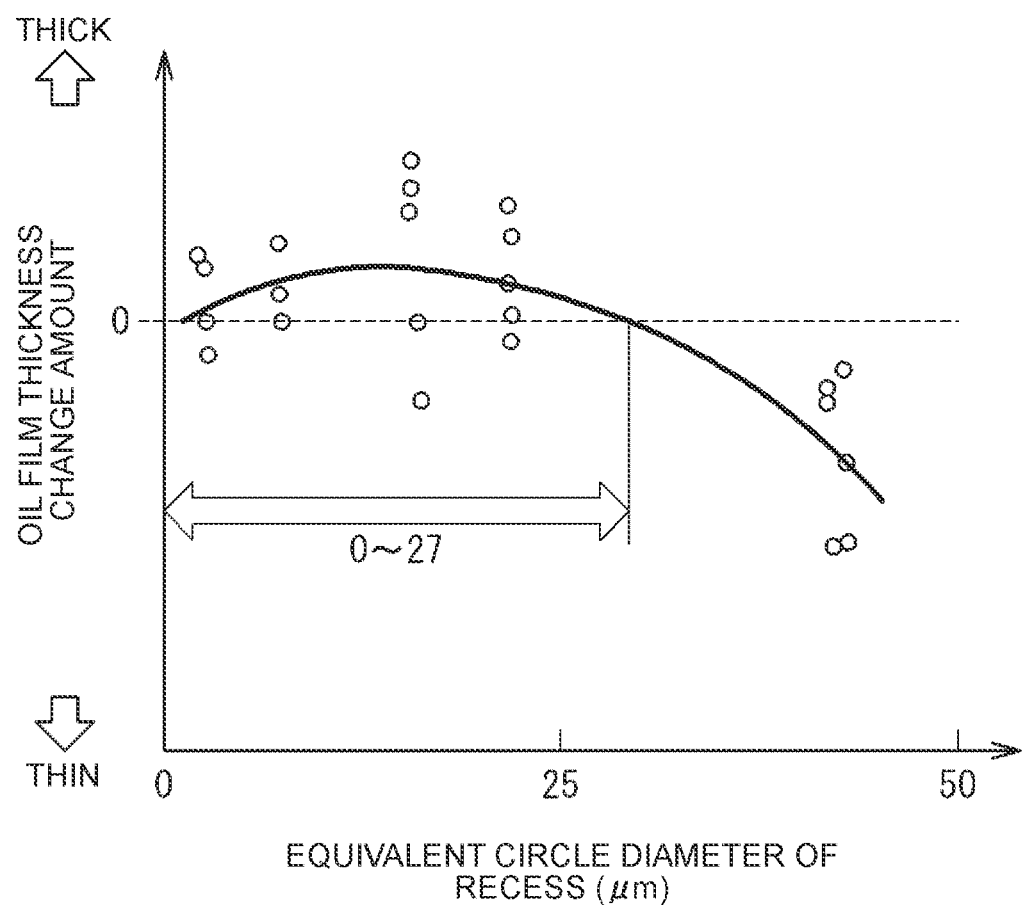
FIG. 5, is a graph showing the results of the evaluation test. In the graph, the vertical axis indicates the oil film thickness change amount, and the horizontal axis indicates an equivalent circle diameter of the recess.

FIG. 5 is a graph showing the results of the above-described evaluation test. In the graph, the vertical axis indicates the oil film thickness change amount, and the horizontal axis indicates the equivalent circle diameter of the recess. As shown in FIG. 5, when the equivalent circle diameter of the recess is in the range of 1 µm to 27 µm, the values of the oil film thickness change amounts are generally large, and the oil film thicknesses of the processed surfaces on which the recesses are provided are large. Therefore, as can be seen from the graph, by setting the equivalent circle diameter of the recess in the range of 1 µm to 27 µm, the lubricant oil can be more easily accumulated in the recesses, and the oil film thickness can be made large (i.e., the oil film thickness can be increased).

Figure 6:
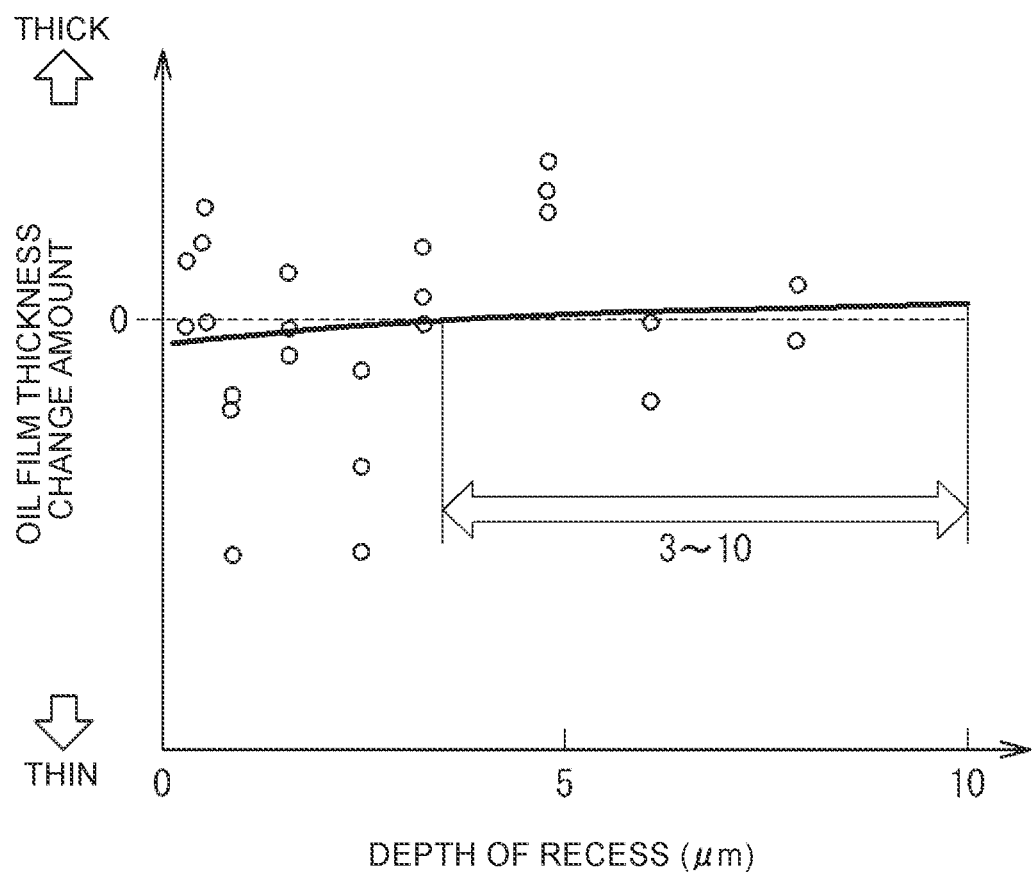
FIG. 6 is a graph showing the results of the evaluation test. In the graph, the vertical axis indicates the oil film thickness change amount, and the horizontal axis indicates a depth of the recess.

FIG. 6 is a graph showing the results of the above-described evaluation test. In the graph, the vertical axis indicates the oil film thickness change amount, and the horizontal axis indicates the depth of the recess. As shown in FIG. 6, when the depth of the recess is in the range of 3 µm to 10 µm, the values of the oil film thickness change amounts are generally large, and the oil film thicknesses of the processed surfaces on which the recesses are provided are large. Therefore, as can be seen from the graph, by setting the depth of the recess in the range of 3 µm to 10 µm, the lubricant oil can be more easily accumulated in the recesses, and the oil film thickness can be made large (i.e., the oil film thickness can be increased).

Figure 7:
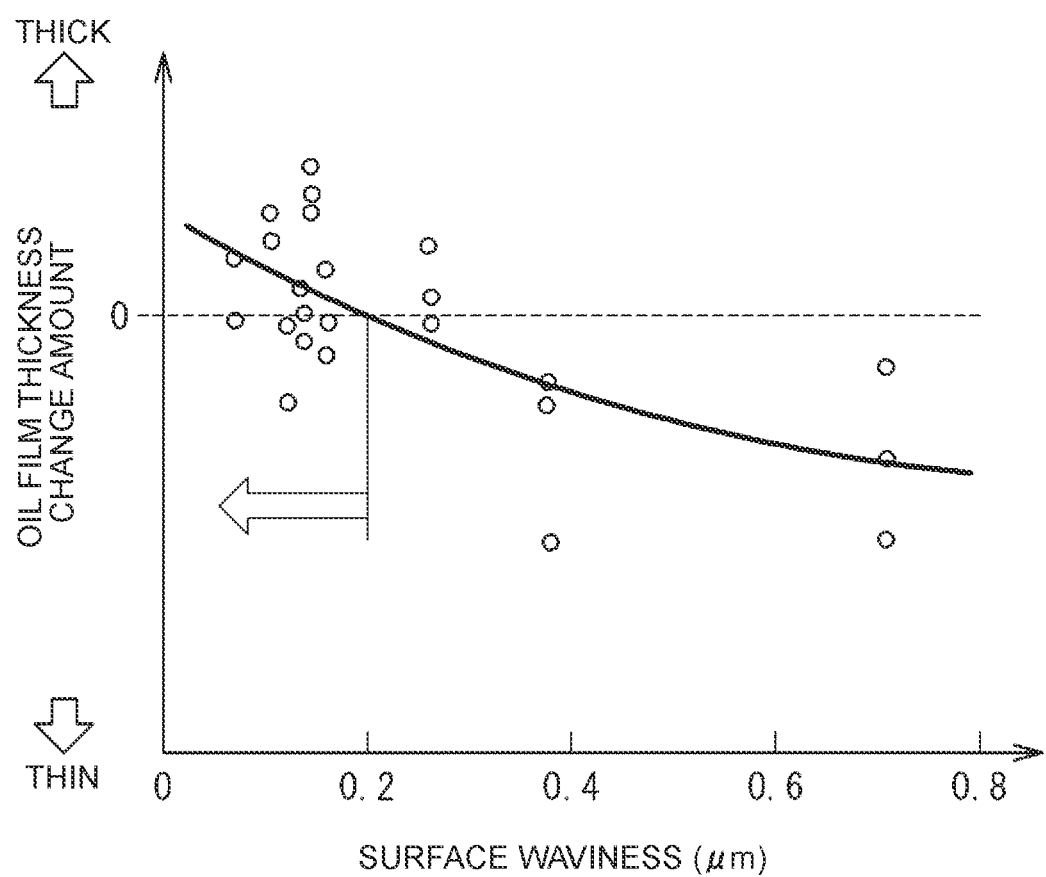
FIG. 7 is a graph showing the results of the evaluation test. In the graph, the vertical axis indicates the oil film thickness change amount, and the horizontal axis indicate a surface waviness of a surface excluding the recesses.

FIG. 7 is a graph showing the results of the above-described evaluation test. In the graph, the vertical axis indicates the oil film thickness change amount, and the horizontal axis indicates the surface waviness of the surface excluding the recesses. As shown in FIG. 7, when the surface waviness of the surface excluding the recesses is in the range of 0.2 µm or less, the values of the oil film thickness change amounts are generally large, and the oil film thicknesses of the processed surfaces on which the recesses are provided are large. Therefore, as can be seen from the graph, by setting the surface waviness of the surface excluding the recesses to be in the range of 0.2 µm or less, the lubricant oil can be easily accumulated in the recesses, and the oil film thickness can be made large (i.e., the oil film thickness can be increased).

FIG. 8 is a table showing the results of the above-described evaluation test. As shown in FIG. 8, among the nine sets of samples A to J, only the samples G (G-1, G-2, G-3) show that all the oil film thickness change amounts have positive values, which indicates that the oil film thickness on the processed surface on which the recesses are provided is increased. Then, in each sample G, the area ratio of the recesses has the value (15%) in the range of 5% to 37%, and the equivalent circle diameter of the recess is the value (15.31 µm) in the range of 1 µm to 27 µm. The depth of the recess has the value (4.788 µm) that is in the range of 3 µm to 10 µm, and the surface waviness of the surface excluding the recesses has the value (0.148 µm) that is in the range of 0.2 µm or less. Therefore, as can be seen from the test results, by setting the area ratio of the recesses, the equivalent circle diameter and the depth of the recess, and the surface waviness of the surface excluding the recesses in the respective ranges as described above, the lubricant oil can be easily accumulated in the recesses, and the oil film thickness on the processed surface on which the recesses are provided can be increased.

As described above, in the rolling bearing 10 of this embodiment, the lubricant oil can be easily accumulated in the multiple recesses 20 provided on the rolling surface 14 of the needle roller 13, and the oil film thickness on the rolling surface 14 can be increased. With this configuration, a shortage of the oil film on the rolling surface 14 can be restrained. Therefore, a temperature rise of the rolling bearing 10 can be restrained, and seizure resistance can be improved.

The embodiments described above are to be considered as illustrative and not restrictive in all respects. That is, the rolling bearing according to the disclosure is not limited to the ones described in the above embodiment illustrated in the drawings, and various modifications may be made within the scope of the disclosure. For example, in the above embodiment, the recesses 20 are provided on the rolling surfaces 14 of all the needle rollers 13. However, the recesses 20 may be provided on the rolling surface 14 of at least one needle roller 13. Further, the recesses 20 may be provided on at least one surface among the first raceway surface 11, the second raceway surface 12, and the rolling surfaces 14 of the needle rollers 13.

The rolling bearing of the disclosure may be a roller bearing other than the needle roller bearing, such as a self-aligning roller bearing or a cylindrical roller bearing. The rolling elements of the rolling bearing may be cylindrical rollers or long cylindrical rollers (i.e., rod rollers) other than the needle rollers. Further, the rolling bearing may be a ball bearing including balls as rolling elements, in addition to a rolling bearing including rollers as rolling elements. Yet further, the example where the rolling bearing of the disclosure is applied to the planetary gear mechanism in the transmission is described. However, application of the rolling bearing is not limited thereto.

What is claimed is:
1. A rolling bearing comprising:
a first raceway surface;
a second raceway surface; and
a plurality of rolling elements rotatably arranged between the first raceway surface and the second raceway surface, wherein
multiple recesses are provided on at least one surface among the first raceway surface, the second raceway surface, and rolling surfaces of the plurality of the rolling elements,
an area ratio of openings of the recesses to the at least one surface is in a range of 5% to 37%,
an equivalent circle diameter of the opening of each of the recesses is in a range of 1 µm to 27 µm,
a depth of each of the recesses in a direction normal to the at least one surface is in a range of 3 µm to 10 µm, and
a surface waviness of the at least one surface excluding the recesses is smaller than or equal to 0.2 µm.
2. The rolling bearing according to claim 1, wherein the rolling elements are rollers.

3. The rolling bearing according to claim 2, wherein each of the rolling elements is any one of a needle roller, a cylindrical roller, and a long cylindrical roller.

* * * * *